United States Patent Office 2,894,919
Patented July 14, 1959

2,894,919

FLEXIBLE RESILIENT CELLULAR POLYURETHANE RESIN PRODUCTS

Eli Simon, Los Angeles, and Frank W. Thomas, Burbank, Calif., assignors to Lockheed Aircraft Corporation, Burbank, Calif.

No Drawing. Application August 2, 1954
Serial No. 447,428

8 Claims. (Cl. 260—2.5)

This invention relates to cellular or foamed resin products and relates more particularly to such expanded or cellular plastic products and materials that are flexible, yielding and resilient.

Cellular plastics have been prepared in the past by reacting diisocyanates, alkyd resins and catalysts with or without modifiers, fillers, etc. A valuable characteristic or attribute of such earlier products was the ability of the mixed ingredients to react and foam up at atmospheric pressure and room temperature to form the foamed or cellular products without the necessity of employing special, expensive pressure and/or temperature controlling equipment. However, the cellular isocyanate-alkyd resin products thus produced were rigid, unyielding and often quite brittle. Cellular or foamed latex, which is flexible and resilient, is produced in quite large quantities but requires the use of intricate molding and curing equipment and is, therefore, expensive. Recently, flexible or elastomeric cellular isocyanate-resin reaction products have been introduced. The manufacture of these latter products requires special expensive mixing equipment, etc. and their preparation is not adapted for small batch operations or for manual mixing. Furthermore, the elastomeric foams of the latter type that have heretofore been introduced had poor high temperature and low temperature characteristics, had poor abrasion resistant characteristics, did not effectively resist tearing, and had rather poor water resistance characteristics.

It is an object of this invention to provide expanded or cellular resin products that are yielding, resilient and flexible and that may be prepared without special or expensive mixing equipment, or the like, and allowed to react or foam up at room temperature and atmospheric pressure. In accordance with the invention, the components or ingredients are merely mixed together manually, or otherwise, to form a flowable, reactant mixture and this resultant mixture may be poured into a cavity or mold, onto a surface, or into place in a structure to react and foam up at atmospheric pressure to constitute an expanded or cellular resin product that is resilient and flexible and that dependably and strongly adheres to the surfaces which it contacts unless such surfaces have previously been provided with parting compounds. The reactant mixtures of the invention may be applied by blading, brushing, dipping, spraying, or the like, to react at room temperature and pressure to form the cellular, flexible and resilient layers or bodies. Where no special apparatus or equipment is required the products are adapted for small batch use and for manual mixing and application.

Another object of the invention is to provide cellular resin products or materials of the class described that are resistant to water, that are resistant to tearing and that retain their flexibility and elastomeric properties at both low temperatures and high temperatures and, therefore, are suitable for numerous applications for which the earlier cellular products of this general type are unsuited.

Another object of the invention is to provide flexible, resilient foamed plastic products that may be formulated to have internal cells of practically any size, to have the selected or required density and to have different selected rates of return following compression or deformation. The products of the invention may be formulated or prepared to have a slow or relatively slow rate of return following deformation as distinguished from the rapid elastic return of latex and latex-like products. This slow rate of return particularly well adapts the products of the invention for many applications or uses such as packaging and potting, personal protective equipment, shock absorbing installations, etc.

A further object of the invention is to provide expanded or cellular resin products of the class referred to having excellent thermal insulating characteristics and dielectric strength properties and, therefore, are well adapted for employment in the electrical fields and in situations where thermal insulation is required. Furthermore, the products of the invention may be made to have intercommunicating cells so as to be porous and water absorbant and therefore to be useful as "sponges," cleaning devices, etc.

Other objectives and advantages of the present invention will become apparent from the following detailed description, which includes several examples or formulations intended primarily to be illustrative and typical and not restrictive in their nature.

The principal or basic components of the mixtures or formulations for preparing the foamed or cellular products of the invention comprise one or more resins, a catalyst and a gassing agent. The resins employed are derived polymers or copolymers of polyisocyanates, polyisothiocyanates, and their blends. In addition to the primary ingredients the reactant mixtures may include free isocyanates, plasticizers, wetting agents, modifier resins, fillers, dyes, solvents, etc.

The preferred types of resins for producing the flexible cellular plastic products of the invention are those containing reacted or partially reacted polyisocyanates, polyisothiocyanates and their blends. Typical of the resins having chemical compositions suitable for modification by the polyisocyanates or polythiocyanates are Thiokols, polyesters, polyamides, polyureas, polyesteramides, polyurethanes and blends or combinations of the same. Although the resins are synthesized in accordance with known rules of polymer formation, the selection of certain novel components and the manner and sequence of combining them, bring about new resins having unusual characteristics, particularly well suiting them for the production of the flexible resilient foams of the invention. A general characteristic or requirement for these resins is that they include or consist of polymer chains or systems of polymer chains containing active or functional chemical groupings at given or specified intervals by which the chains or chain systems are caused to be bound one to the other. The molecular units which we select are caused to conform to typical patterns. The molecular components selected are representative of but not exclusive of applicable units known in the art. Two general types of polymers are basically suitable for the production of the elastomeric fiber. The first is an anchored linear polymer chain containing reactive functional groups at specified intervals and the second are linear polymers which do not initially contain such anchor units but have these anchor units formed or supplied during the final foaming reaction and cure of the foaming reactant mixtures which contain certain additives or modifiers. We prefer to employ the anchored linear polymer type. These preferred resins are the result of the chemical reaction of polyisocyanates or polyisocyanate blends or polyisothiocyanates or isocyanateisothiocyanate groups on a single molecule at 20–80 mol percent with polylabile hydrogen type compounds such as acids, alcohols, amines, silicols, enols, amines, imines, amidines, amides, ureas, thioureas, thioamides, mercaptans, aldols, amino alcohols, ureides, thiolic acids, hydro-oxamic acids, hydrazines, etc.

The preferred resins fall into two general categories or classes which will herein be referred to as Resins A and Resins B. The components of type A resin or type B resin are not all permitted to compete one with the other simultaneously for the active or functional groups of a present coreactant molecule. It is preferred that initial reaction occur in accordance with a given order of component addition to obtain reproduceable, controllable and predetermined resultant resins. The preferred order of reaction of the components in preparing the A type resins is: first a reaction between (1) a diisocyanate, polyisocyanate, polyisothiocyanate or blends thereof; (2) diols such as polyglycols, linear aliphatic glycols or substituted or unsubstituted modifications and blends thereof. The diols may be replaced up to 40% by weight by nitrogen base resinous compositions of mol. wt. range 500–10,000 which are reaction products of dibasic alkyl carboxylic acids with amino alcohols and alkyl amines, and the self-esterified reaction products of linear alkyl-amino acids, or polymeric polysulfides within the mol. wt. range of 200–10,000, known commercially as Thiokol base compounds, and which preferably are the reaction product of dihaloalkyl formals, sodium polysulfide and trihaloalkyls, such as reaction products of dichloroethyl formal, sodium polysulfide and trichloropropane.

The second stage of the preparation of an A resin is the addition and reaction thereof of a bifunctional acid such as a linear hydroxy acid, a dicarboxylic acid, an amino acid or unsaturated substituted modifications or blends of the same, and water. The third stage of the preparation or reaction of an A resin is the reaction between the pre-reticulated polymers resulting from the first and second stages of reaction, above described, and a reticulating agent which is a trifunctional molecule containing alcohol, carboxylic acid, amine or mercaptan groups, or mixtures of the same. The reaction of an A resin is concluded when the resin reaches an amine equivalent of from 150 to 1000, a value of approximately 500 being preferred. In describing the preparation or reaction of both the A resins and the B resins, the reticulating agents referred to are comprised of a molecule containing more than two functional groups consisting of isocyanates, isothiocyanates, or the above mentioned polylabile-hydrogen compounds.

The preferred order of reacting the compounds in preparing the B resins is to first bring about a reaction between one or more diisocyanates and one or more diols, being the same as the first stage reaction in preparing the A resins, secondly the reaction between the product of this first reaction, and polymers or blends of polymers constituting a "C" class of resins and water, and thirdly the reaction between the pre-reticulated polymer resulting from the first and second reactions and a reticulating agent, namely a trifunctional molecule containing alcohol, carboxylic acid, amine or mercaptan groups, or mixtures of the same. The resins of the "C" class may be grouped as follows:

"C," Type I, polyesters, such as reaction products between dibasic acids and dihydric alcohols "C," Type II, nitrogen base polymers, such as polyamides and/or esteramides "C," Type III, silicon base polymers, such as silco polyesters "C," Type IV, sulfur base polymers, i.e. such as polymeric polysulfides The reaction is concluded when the amine equivalent of the B type resin reaches a value of from 150 to 1000, the preferred value being approximately 350. In synthesizing or preparing the class B foaming resins, modifying resins are used as reactant intermediate resins, the same containing or possessing labile hydrogen atoms capable of reacting with the isocyanate or polyisocyanate-isocyanate blends. These modifying resins may be polyesters, polyamides and esteramides, silico polyesters or polysulfide resins. The polyesters are the reaction products of saturated, unsaturated, substituted or unsubstituted alkyl polyfunctional alcohols and acids preferably dibasic acids, and alcohols and have an acid number range of from 0.1 to 200, preferably approximately 50. The polyamides and esteramides are the self polymerization reaction products via the bifunctional condensation of amino acids, of the bi-functional reaction products of amino alcohols with dibasic acids, or mixtures thereof. These polyamides and esteramides preferably have a molecular weight of from 500 to 10,000. The silico polyesters useful as the modifying resins are the reaction products of organic bifunctional silanols, silacols or condensed silacols, such as linear alkyl polyhydroxy polysiloxanes with the alcohols or acids or amines such as used in the preparation of the above described polyesters and polyamides. The molecular weight of the silico polyesters may range between 500 and 10,000.

Certain of the polysulfides or "Thiokols" such as the liquid polymers are useful as modifiers of the B resins of the invention. These polysulfides which are liquid polymers and preferably have a molecular weight of from 200 to 10,000 are essentially bifunctional reaction products derived from organic mono di and tri halides and sodium polysulfide, the polymer segments being linked together by sulphur bonds. The functional groups contain hydrogen reactive to the isocyanate radical and may consist of mercaptan groups such as terminal mercaptan groups, hydroxyl, carboxyl and amino groups. The liquid polymers may also contain terminal, alkyl and other non-functional groups provided there are at least two groups reactive to the isocyanate. For reaction with sodium polysulfide, dichloro ethylformal or bis (2-chloroethyl) formal is preferred as the organic dihalide although other dihalides such as ethylene dichloride, propylene dichloride, dichlor di-ethyl ether and glycerol dichlorhydrin can all be used alone or in mixtures to form the copolymers. It is preferred that these polysulfide liquid polymers be prepared with a small amount of a trifunctional halide such as trichloropropane, chloroform and trichloroethylene for cross linking some of the chain segments. These liquid polymers are conventionally prepared by the reductive cleavage of the disulfide groups of higher molecular weight solid polymers to yield lower molecular weight liquid polymers which have thiol terminals. It is also possible to prepare liquids of low molecular weights by using a deficiency of sodium polysulfide.

The preferred examples of the polyester resins suitable as modifiers for the type B resins of the invention include 1,3 butylene glycol employed in the molecular range of from 80 to 50% and sebacic acid employed in the molecular percentage range of from 20 to 50%, such resins having an acid number range of from 20 to 150. Other glycols that may be used in such resins, either individually or in mixtures, include propylene, pentylene, hexylene, dipropylene glycol, diethylene and triethylene glycols, as well as the following diols: (2,2-diethyl - 1,3 propanediol), (2 - ethyl hexane diol - 1,3); (2-ethoxymethyl-2,4-dimethyl pentanediol, 1-5), (2-methyl 2-propyl-1,3-propanediol) and substituted and unsaturated homologues of the same. Other typical or representative dibasic acids that may be employed are succinic, malonic, adipic, glutaric, suberic, octadecadiendioic, maleic, fumaric, azaleic, itaconic, citraconic and their saturated and unsaturated substituted or unsubstituted homologues. The invention also contemplates the use of mixed polyesters as the polyester resin modifiers for the B type resins of the invention. Such mixed polyesters include diethylene glycol adipate-sebacate, propylene glycol-butylene glycol-sebacate, and propylene glycol-butylene glycol-sebacate-succinate. The following are typical preferred formulations of the Class C, Types I, II, III and IV modifying resins for the B resins:

TYPE I (POLYESTER)

*Resin—Class C, Type I(a)*

| | Mol percent range |
|---|---|
| 1,3 butylene glycol | 80–50 |
| Sebacic acid | 20–50 |
| Acid no. range | 20–150 |

*Resin—Class C, Type I(b)*

| | |
|---|---|
| 1,4 butylene glycol | 80–50 |
| Sebacic acid (50–80 mol percent); azelaic acid (50–20 mol percent) | 20–50 |
| Acid no. range | 20–150 |

*Resin—Class C, Type I(c)*

| | |
|---|---|
| 1,4 butylene glycol (99–95 mol percent), polypropylene glycol "4000" (1.0–5.0 mol percent) | 80–50 |
| Sebacic acid | 20–50 |
| Acid no. range | 20–150 |

*Resin—Class C, Type I(d)*

| | |
|---|---|
| 1,4 butylene glycol (50–90 mol percent), polypropylene glycol (400) (10–50 mol percent) | 80–50 |
| Sebacic acid (50–90 mol percent); suberic acid (10–50 mol percent) | 20–50 |
| Acid no. range | 20–150 |

*Resin—Class C, Type I(e)*

| | |
|---|---|
| 1,4 butane diol (90–98 mol percent), 1-2-6 hexane triol (2–10 mol percent) | 50–80 |
| Sebacic acid | 50–20 |
| Acid no. range | 20–150 |

*Resin—Class C, Type I(f)*

| | |
|---|---|
| 1,4 butane diol | 80–50 |
| α-Hydroxy decanoic acid | 10–25 |
| Sebacic acid | 10–25 |
| Acid no. range | 20–150 |

*Resin—Class C, Type I(g)*

| | |
|---|---|
| Propylene glycol | 80–50 |
| Sebacic acid | 10–25 |
| Adipic acid | 10–25 |
| Acid no. range | 20–100 |

*Resin—Class C, Type I(h)*

| | Percent by weight |
|---|---|
| Class C, Type I(a), Class C, Type I(b) | 10–80 |

*Resin—Class C, Type I(i)*

| | |
|---|---|
| Class C, Type I(d), Class C, Type I(e) | 10–80 |

*Resin—Class C, Type I(j)*

| | |
|---|---|
| Class C, Type I(g), Class C, Type I(f) | 10–80 |

TYPE II (POLYAMIDE)

*Resin—Class C, Type II(a)*

| | Mol percent range |
|---|---|
| Hexamethylene diamine | 80–50 |
| Sebacic acid | 20–50 |

Mol. wt. range, 500–10,000.

TYPE III (SILICO POLYESTERS)

*Resin—Class C, Type III(a)*

| | Mol percent range |
|---|---|
| Dihydroxy dipropylsilane | 80–50 |
| Adipic acid | 20–50 |

Mol. wt. range, 500–10,000.

TYPE IV (LIQUID POLYSULFIDE RESINS)

*Resin—Class C, Type IV(a)*

| | Mol percent range |
|---|---|
| Bis (2-chloroethyl formal) | 98 |
| Trichloro propane | 2 |
| Sodium polysulfide ($Na_2S_x$) in which $x=2$–4.5 | 60–120 mol percent of the formal. |

Among the polyamides which we prefer to use as modifiers for the type B resins of the invention are the condensation reaction products between hexamethylene diamine in the mol percent of from 20 to 50. Other resins of a similar nature useful as the modifiers for the B resins may be provided by other amine homologues such as octadecyl diamine and pentamethylene diamine; furthermore, acids of the type employed in the preparation of the above mentioned polyester modifiers may be employed.

The following tables indicate the proportion limitations or ranges of the components employed in the preparation of the above described Resins A and B, the proportions being given in mol percent, the minimum and maximum percentages for the individual components being the quantities usable in its optimum formula to yield 100 mol percent.

A–RESIN

| | Min. Mol Percent | Mols, Min. | Opt. Mol Percent | Mols, Opt. | Max. Mol Percent | Mols, Max. |
|---|---|---|---|---|---|---|
| diol alcohol | 2.5 | ¼ | 9.3 | 1 | 23.5 | 3 |
| bifunctional acid | 2.5 | ¼ | 9.3 | 1 | 23.5 | 3 |
| reticulating agent | 1.08 | ⅛ | 4.65 | ½ | 16.3 | 2 |
| diisocyanate [1] | 64.5 | 5 | 74.43 | 8 | 84.5 | 15 |
| water | 0.59 | ¹⁄₁₆ | 2.32 | ¼ | 8.7 | 1 |
| | | | 100 | 10.75 | | |

B–RESIN

| | Min. Mols | Min. Mol Percent | Opt. Mols | Opt. Mol Percent | Max. Mols | Max. Mol Percent |
|---|---|---|---|---|---|---|
| diol (alcohol) | ¼ | 1.7 | 1 | 6.6 | 3 | 17.5 |
| polyester | ¼ | 1.7 | 1½ | 10.0 | 3 | 18.0 |
| reticulating agent | ⅛ | 0.84 | ⅜ | 2.4 | 2 | 12.0 |
| water | ¹⁄₁₆ | 0.42 | ¼ | 1.6 | 1 | 6.9 |
| diisocyanate [1] | 5 | 55.0 | 12 | 79.34 | 20 | 85.0 |
| | | | 15.125 | 100 | | |

[1] The diisocyanate may be replaced by a blend of polyisocyanates and polyisothiocyanates.

The isocyanate component of the foaming resins of the invention are polyisocyanates and polyisothiocyanates of the general formula:

OCN—R—NCO, SCN—R—NCS, and SCN—R—NCO in which R is an intervening organic group or groups.
Examples of the suitable diisocyanates and diisothiocyanates are as follows:

2,4 toluene diisothiocyanate
Hexamethylene diisothiocyanate
2-5 naphthalene diisothiocyanate
2-4 cyclo hexylene diisothiocyanate
1, chloro 2,5 naphthalene diisothiocyanate
1,4 butane diisothiocyanate
2,4 toluene diisocyanate
2,6 toluene diisocyanate
Mixtures of 2,4 and 2,6 toluene diisocyanates
Dianisidine diisocyanate
1,4 benzene diisocyanate
p-p Diisocyanato diphenyl methane
Hexamethylene diisocyanate
1, chlorophenyl-2,4 diisocyanate 2,5 naphthalene diisocyanate
1 nitro phenyl 2,4 diisocyanate
Polymethylene diisocyanates such as trimethylene diisocyanates and pentamethylene diisocyanate
Alkylene diisocyanates such as butylene-1,2-diisocyanate and butylene 1,4 diisocyanate
Xylene diisocyanate
2-4 cyclohexylene diisocyanate
2,5 dichloro octane diisocyanate
1,1 dibutyl ether diisocyanate
1,6 cyclopentane diisocyanate
2,5 indene diisocyanate Examples of isocyanates and isothiocyanates having a functionality greater than 2 that may be used as reticulating agents in the preparation of the foaming Resins A and B of the invention include:

1,3,5 phenyl triisocyanate
2,4,6 toluene triisocyanate
1,3,6 hexamethylene triisocyanate
1,3,5 naphthalene triisocyanate
Triphenyl methane triisocyanate
1,3,5 phenyl triisothiocyanate
2,4,6 toluene triisothiocyanate
1,3,6 hexamethylene triisothiocyanate
1,3,5 naphthalene triisothiocyanate
Triphenyl methane triisothiocyanate.

Suitable polyfunctional alcohols from which the polyurethane or polythiourethane intermediates may be prepared include aliphatic diols of linear structure represented as follows:

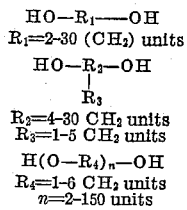

$HO-R_1-OH$
$R_1=2\text{-}30\ (CH_2)$ units $HO-R_2-OH$
           $|$
           $R_3$
$R_2=4\text{-}30\ CH_2$ units
$R_3=1\text{-}5\ CH_2$ units $H(O-R_4)_n-OH$
$R_4=1\text{-}6\ CH_2$ units
$n=2\text{-}150$ units Substitution of halide, nitro, amine, keto or ether groups may occur as parts of the R groups above. Unsaturation or the occurrence of ethylenic or acetylenic linkages in the structure is also permissable.

Where polyhydric alcohols are employed as reticulating agents in the preparation of the resins of the invention it is required that three or more functional hydroxy groups be present. These structures are analogous to those of the diols except that methylene hydrogen atoms are replaced by hydroxy groups. The aliphatic polyhydric alcohols employed may contain aromatic, alicyclic or heterocyclic groups provided that no more than one is employed per molecule unit.

Polyols such as dihydric alcohols, glycols, polyglycols, and blends of the same are suitable as reactant diols in the preparation of the A and B resins of the invention. It is preferred to use glycols or low molecular weight diols (molecular weight not greater than 400) in combination with polyglycols such as polypropylene glycol, polyethylene glycol, and polybutene glycol having an average molecular weight in the range between 400 and 10,000. In blends of the low molecular weight glycol and polyglycols there should be no more than 20 mol percent of the glycol. Typical examples of the polyols which we prefer to employ as reactants with the polyisocyanates and polyisothiocyanates and their blends are:

1,4 butane diol
2 methyl butane diol 1,4
Hexanediol
Polypropylene glycol 3000
Polypropylene glycol 4000
Polypropylene glycol 1000
Polypropylene glycol 10,000
Butynediol
1,3 propylene glycol Polyhydric alcohols having a functionality greater than 2 may be employed as reticulating agents for the resins of the invention. Such polyhydric alcohols include glycerol, polyglycerol, diglycerol, mannitol, sorbitol, pentaerythritol, dipentaerythritol, 1-2-6 hexanetriol, 1-2-4 butanetriol. If polyhydric alcohols having a functionality greater than 3 are employed they must be used in blends with triols in proportions where the triol is not less than 50 mol percent of the blend employed as a reticulating agent.

Polyfunctional alkylorganic acids suitable for reaction during the second stage of the preparation of the "A" resins are substituted, unsubstituted, saturated or unsaturated and may include polycarboxylic types having a molecular weight range of from 90 to 800 and hydroxy carboxylic types having a molecular weight range of from 75 to 800. Suitable carboxylic types of such acids include malonic, succinic, sebacic, adipic, pimelic and azelaic while suitable hydroxy carboxylic acids include 1-hydroxy decanoic acid, ricinoleic acid and glycolic acid. The use of polyfunctional acids as reticulating agents requires that three or more functional groups with regard to labile hydrogen be present in their respective molecules. Typical examples include tartaric acid; 1,2 dihydroxy 1, butanoic acid; butane tetracarboxylic acid; 1,2,6 hexane trioic acid; 1-hydroxy, 3-amino, 5-pentanoic acid; and ethylene diamine tetra-acetic acid.

The following formulations of Examples 1 to 15 inclusive are typical preferred examples of the Type A resins of the invention, while the following Examples 16 to 31 inclusive are typical preferred formulations for the Type B resins, which latter include a third or "C" class in their compositions. In these several examples the constituents or ingredients are in mol percentages.

Resin 1

(Amine equivalent 500–700)

| | Mol percent |
|---|---|
| 2,4 toluene diisocyanate | 74.43 |
| Polypropylene glycol (avg. mol. wt. 3,000) | 9.30 |
| Ricinoleic acid | 9.30 |
| Water | 2.32 |
| 1,2,6 hexanetriol (range 2–8 mol percent) | 4.65 |

Resin 2

(Amine equivalent 500–600)

| | |
|---|---|
| 2,4 toluene diisocyanate (60–90 mol percent), 2,6 toluene diisocyanate | 74.43 |
| Hydroxy decanoic acid | 9.30 |
| Water (range 2–4 mol percent) | 2.32 |
| Trimethylol propane | 4.65 |
| Polypropylene glycol (avg. mol. wt. 10,000) | 9.30 |

Resin 3

(Amine equivalent 450–500)

| | |
|---|---|
| 2,4 toluene diisocyanate (60–90 mol percent), hexamethylene diisocyanate | 74.43 |
| Sebacic acid | 9.30 |
| Hexamethylene glycol (5–15 mol percent) | 9.30 |
| Polypropylene glycol 3000, water | 2.32 |
| 1-2-6 hexanetriol (range 1–8 mol percent) | 4.65 |

Resin 4

(Amine equivalent 400–500)

| | |
|---|---|
| 2,4 phenylenediisocyanate (70–80 mol percent), 1,4 phenyldiisocyanate | 74.43 |
| Polyethylene glycol (avg. mol. wt. 600) | 9.30 |
| Pentaerythritol, 1,2,6 hexanetriol (50–90 mol percent) | 4.65 |
| Ricinoleic acid (50–90 mol percent), lactic acid | 9.30 |
| Water | 2.32 |

Resin 5
(Amine equivalent 400–600)

| | Mol percent |
|---|---|
| Meta toluene diisocyanate, dianisidine diisocyanate (1–5 mol percent) | 74.43 |
| Polypropylene glycol (avg. mol. wt. 3000), dihydroxydiethylsilane (1–5 mol percent) | 9.30 |
| Ricinoleic acid, hydroxyacetic acid (6–18 mol percent) | 9.30 |
| Glycerol | 4.65 |
| Water | 2.32 |

Resin 6
(Amine equivalent 500–600)

| | Mol percent |
|---|---|
| p-p' Diphenyldiisocyanate (1–5 mol percent), 2,6 meta toluene diisocyanate | 74.43 |
| Butynediol (1–15 mol percent), polypropylene glycol (avg. mol. wt. 2000) | 9.30 |
| Alphahydroxy decanoic acid | 9.30 |
| Mannitol | 4.65 |
| Water | 2.32 |

Resin 7
(Amine equivalent 300–600)

| | Mol percent |
|---|---|
| Diethylsilane diisocyanate (1–10 mol percent), 2-4 meta toluene diisocyanate | 74.43 |
| 2,4 dichloro 1,4 butanediol, polypropylene glycol (avg. mol. wt. 4000) (50–90 mol percent) | 9.30 |
| 1,2,6 hexanetriol | 4.65 |
| Adipic acid, butane tetracarboxylic acid (2–8 mol percent) | 9.30 |
| Water | 2.32 |

Resin 8
(Amine equivalent 400–600)

| | Mol percent |
|---|---|
| 2,4 meta toluene diisocyanate, methylsilane triisocyanate (1–2 mol percent) | 74.43 |
| Beta chloropolypropylene glycol (avg. mol. wt. 2000) | 9.30 |
| Octadecadienedioic acid | 9.30 |
| 1,2,6 hexanetriol | 4.65 |
| Water | 2.32 |

Resin 9
(Amine equivalent 500–600)

| | Mol percent |
|---|---|
| 6-nitro 2-4 toluene diisocyanate, 2,6 toluene diisocyanate (80–90 mol percent) | 74.43 |
| Amino ethanol, polypropylene glycol (avg. mol. wt. 3000) (80–90 mol percent) | 9.30 |
| Water | 2.32 |
| Triethanolamine | 4.65 |
| Ricinoleic acid, 2-hydroxy malic acid (1–10 mol percent) | 9.30 |

Resin 10
(Amine equivalent 400–500)

| | Mol percent |
|---|---|
| 2,4 toluene diisocyanate | 74.43 |
| Polybutylene glycol [1] (avg. mol. wt. 3000) | [1]9.30 |
| Ricinoleic acid, tartaric acid (1–5 mol percent) | 9.30 |
| 1,2,6 hexanetriol, diethylene triamine (1–5 mol percent) | 4.65 |
| Water | 2.32 |

[1] Range 4–10 mol percent.

Resin 11
(Amine equivalent 300–600)

| | Mol percent |
|---|---|
| 2,4 toluene diisocyanate | 74.43 |
| Polypropylene glycol [1] (avg. mol. wt. 5000) | [1]9.30 |
| Ricinoleic acid | 9.30 |
| Water | 2.32 |
| 1,2,6 hexanetriol | 4.65 |

[1] Range 4–15 mol percent.

Resin 12
(Amine equivalent 300–600)

| | Mol percent |
|---|---|
| 2,4 toluene diisocyanate | 74.43 |
| Polybutylene glycol [1] (avg. mol. wt. 2000) | [1]9.30 |
| Ricinoleic acid | 9.30 |
| Water | 2.32 |
| 1,2,6 hexanetriol | 4.65 |

[1] Range 4–20 mol percent.

Resin 13
(Amine equivalent 300–600)

| | Mol percent |
|---|---|
| 2,4 toluene diisocyanate | 74.43 |
| Polyethylene glycol [1] (avg. mol. wt. 1000) | [1]9.30 |
| Ricinoleic acid | 9.30 |
| Water | 2.32 |
| 1,2,6 hexanetriol | 4.65 |

[1] Range 4–20 mol percent.

Resin 14
(Amine equivalent 400–700)

| | Mol percent |
|---|---|
| Meta toluene diisocyanate | 74.43 |
| Polypropylene glycol [1] (avg. mol. wt. 4000) | [1]9.30 |
| Water | 2.32 |
| 1,2,6 hexanetriol | 4.65 |
| Hydroxy propionic acid | 9.30 |

[1] Range 2–15 mol percent.

Resin 15
(Amine equivalent 200–400)

| | Mol percent |
|---|---|
| 2,4 toluenediisocyanate [1] | 79.40 |
| Polypropyleneglycol (avg. mol. wt. 3000) | 6.60 |
| Resin Class "C," Type I-a (acid No. 100–150) | [1]10.00 |
| 1,2,6 hexanetriol | 2.40 |
| Water | 1.60 |

[1] Range 1–10% neutralization equivalent of resin taken as mol. wt. Type I-b, c, d, e, f, may be substituted for Type I-a.

Resin 16
(Amine equivalent 200–400)

| | Mol percent |
|---|---|
| 2,4 toluene diisocyanate, 2,6 toluene diisothiocyanate (1–10 mol percent) | 79.40 |
| Polypropyleneglycol (av. mol. wt. 1000) | 6.60 |
| Resin Class "C," Type I-a (acid No. 50–100) | [1]10.00 |
| Trimethylol propane | 2.40 |
| Water | [2]1.60 |

[1] Range 1–10% neutralization equivalent of resin taken as mol wt. Type I-b through f resins may be substituted for I-a.
[2] Range 2–4 mol percent.

Resin 17
(Amine equivalent 200–300)

| | Mol percent |
|---|---|
| 2,4 toluene diisocyanate, hexamethylene diisocyanate (10–20 mol percent) | 79.40 |
| Resin Class "C," Type II-a (mol. wt. 100–200) | [1]10.00 |
| Water | 1.60 |
| 1,2,6 hexanetriol | [2]2.40 |
| Hexamethylene glycol (10–30 mol percent), polypropyleneglycol (avg. mol. wt. 3000) | 6.60 |

[1] Range 1–10% neutralization equivalent of resin taken as mol. wt.
[2] Range 1–5 mol percent.

Resin 18
(Amine equivalent 300–400)

| | Mol percent |
|---|---|
| 2,4 phenyl diisocyanate (10–50 mol percent), 2,4 toluene diisocyanate | [1]79.4 |
| Polypropylene glycol (avg. mol. wt. 10,000) | 6.6 |
| Resin Class "C," Type II-b (mol. wt. 1500) (5–10 mol percent), Resin Class "C," [2] Type I-a (acid No. 50) [2] | 10.0 |
| Pentaerythritol (5–10 mol percent), 1,2,6 hexanetriol | 2.4 |
| Water | 1.6 |

[1] Range 60–85 mol percent.
[2] Mol percent is considered as 1–10% of the neutralization equivalent.

Resin 19

(Amine equivalent 300–400)

| | Mol percent |
|---|---|
| 2,4 toluene diisocyanate (10–50 mol percent), hexamethylene diisocyanate | 79.4 |
| Dihydroxydiethylsilane (1–5 mol percent), polypropylene glycol (avg. mol. wt. 2000) | 6.6 |
| Resin Class "C," Type III–a | 10.0 |
| Glycerol | 2.4 |
| Water | 1.6 |

Resin 20

(Amine equivalent 200–400)

| | Mol percent |
|---|---|
| 2,6 toluene diisocyanate (10–50 mol percent), p-p' diphenyl diisocyanate | 79.4 |
| Polypropylene glycol (avg. mol. wt. 4000) | 6.6 |
| Resin Class "C," Type I–a (acid No. 50–100),[1] Resin Class "C," Type II–a (mol. wt. 900–1500) (1–10 mol percent), Resin Class "C," Type III–α (mol. wt. 2000–4000) (1–10 mol percent) | 10.0 |
| Mannitol (1–10 mol percent), hexanetriol | 2.4 |
| Water | 1.6 |

[1] Mol percent taken as 1–10% of the neutralization equivalent.

Resin 21

(Amine equivalent 300–400)

| | Mol percent |
|---|---|
| 2,4 toluene diisocyanate, diethylsilane dissocyanate (10–30 mol percent) | 79.4 |
| Polypropylene glycol (avg. mol. wt. 5000), 2-4 dichloro 1,4 butanediol (10–30 mol percent) | 6.6 |
| Water | 1.6 |
| Resin Class "C," IV–a (mol. wt. 500–2000) | 10.0 |
| Ethyl silane triisocyanate (10–20 mol percent), 1,2,6 hexanetriol | [1] 2.4 |

[1] Range ½–5 mol percent.

Resin 22

(Amine equivalent 200–500)

| | Mol percent |
|---|---|
| 2,4 toluene diisocyanate | 79.4 |
| Resin Class "C," Type I–a (acid No. 3–60) | [1] 10.0 |
| Polybutylene glycol (avg. mol. wt. 2000), chloropolypropylene glycol (avg. mol. wt. 1000) (10–50 mol percent) | 6.6 |
| Water | 1.6 |
| Butane tetracarboxylic acid (1–10 mol percent), glycerol | [2] 2.4 |

[1] Mol percent is taken as 1–15% of the neutralization equivalent.
[2] Range may be 1–5 mol percent.

Resin 23

(Amine equivalent 200–300)

| | Mol percent |
|---|---|
| 6-nitro-2,4 toluene diisocyanate (10–30 mol percent), 2,6 toluene diisocyanate | 79.4 |
| Aminoethanol (1–10 mol percent), polypropylene glycol (avg. mol. wt. 2500) | 6.6 |
| Resin Class "C," Type II–a (mol. wt. 4000–5000) | 10.0 |
| Water | 1.6 |
| Triethanolamine (1–5 mol percent), 1,2,6 hexanetriol | 2.4 |

Resin 24

(Amine equivalent 200–500)

| | Mol percent |
|---|---|
| 2,4 toluene diisocyanate | [1] 79.4 |
| Resin Class "C," Type I–a (acid No. 50–200) | [2] 10.0 |
| Polybutylene glycol (avg. mol. wt. 2000) | 6.6 |
| 1,2,6 hexylene triamine (1–5 mol percent), 1,2,6 hexanetriol | 2.4 |
| Water | 1.6 |

[1] Range 65–85 mol percent.
[2] Mol percent is used as 1–15% of the neutralization equivalent.

Resin 25

(Amine equivalent 300–600)

| | Mol percent |
|---|---|
| 2,4 toluene diisocyanate | 79.4 |
| Resin Class "C," Type I–b (acid no. 0.5–10) | [1] 10.0 |
| Polypropylene glycol (avg. mol. wt. 3000) | [2] 6.6 |
| 1,2,6 hexanetriol | 2.4 |
| Water | 1.6 |

[1] Mol percent is used as 1–15% of the neutralization equivalent. I–c through j may be used in place of I–b.
[2] Range 4 to 10 mol percent.

Resin 26

(Amine equivalent 300–500)

| | Mol percent |
|---|---|
| 2,4 toluene diisocyanate | 79.4 |
| Resin Class "C," Type I–c | [1] 10.0 |
| Polypropylene glycol (avg. mol. wt. 2000) | 6.6 |
| 1,2,6 hexanetriol | [2] 2.4 |
| Water | 1.6 |

[1] Mol percent is taken as 1–15% of neutralization equivalent. I–c may be replaced by I–d through j.
[2] Range ½–5 mol percent.

Resin 27

(Amine equivalent 250–500)

| | Mol percent |
|---|---|
| 2,4 toluene diisocyanate | 79.4 |
| Resin Class "C," Type I–d (acid no. 10–100) | [1] 10.0 |
| Polypropylene glycol (avg. mol. wt. 4000) | 6.6 |
| 1,2,4 butanetriol | 2.4 |
| Water | [2] 1.6 |

[1] Mol percent is taken as 1–15% of neutralization equivalent. Type I–d may be replaced by I–e through j.
[2] Range ⅛–2 mol percent.

Resin 28

(Amine equivalent 300–400)

| | Mol percent |
|---|---|
| 2,4 toluene diisocyanate | 79.4 |
| Resin Class "C," Type I–e (acid no. 10–100) | [1] 10.0 |
| Polypropylene glycol (avg. mol. wt. 2500) | [2] 6.6 |
| 1,2,6 hexanetriol | 2.4 |
| Water | 1.6 |

[1] Mol percent is taken as 1–15% of neutralization equivalent. Type I–e may be replaced by I–f through j.
[2] Range 5–10 mol percent.

Resin 29

(Amine equivalent 200–400)

| | Mol percent |
|---|---|
| 2,4 toluene diisocyanate, 2,4 phenyl diisothiocyanate (1–5 mol percent) | 79.4 |
| Resin Class "C," Type I–f (acid no. 1–5.0) | [1] 10.0 |
| Polypropylene glycol (avg. mol. wt. 5000) | 6.6 |
| 1,2,6 hexanetriol | [2] 2.4 |
| Water | 1.6 |

[1] Mol percent is taken as 1–15% of neutralization equivalent. Type I–f may be replaced by I–g through j.
[2] Range ¼–5 mol percent.

Resin 30

(Amine equivalent 300–400)

| | Mol percent |
|---|---|
| 2,4 toluene diisocyanate | 79.4 |
| Resin Class "C," Type I–g (acid no. 5–50) | [1] 10.0 |
| Polypropylene glycol (avg. mol. wt. 2000) | 6.6 |
| Water | 1.6 |
| 1,2,6 hexanetriol | 2.4 |

[1] Mol percent is taken as 8–12% of the neutralization equivalent. Type I–g may be replaced by I–h, I–i, and I–j.

Resin 31

(Amine equivalent 300–400)

| | Mol percent |
|---|---|
| 2,4 toluene diisocyanate, 2,4 phenyl diisothiocyanate (1–10 mol percent) | 79.4 |
| Resin Class "C," Type I-h (1–10 mol percent), Resin Class "C," Type I-a | [1] 10.0 |
| Polypropylene glycol (avg. mol. wt. 1000), polypropylene glycol (avg. mol. wt. 5000) (10–50 mol percent) | 6.6 |
| Water | 1.6 |
| 1,2,6 hexanetriol, mannitol (1–5 mol percent) | 2.4 |

[1] Mol percent is taken as 7–15% of the neutralization equivalent.
Type I-h may be replaced by I-i, I-j.

Molecular weight determinations of resins Class "C," Type I-a through j yield values ranging from 500-upwards to superpolymers of many thousands. We prefer to use a neutralization equivalent value determined from the acid number and defined as the number of grams of resin corresponding to an acid number of 56,100. Acid number of the resin is taken as the number of milligrams of potassium hydroxide required for the neutralization of 1 gram of resin.

The average molecular weight of the polyglycols used in our above examples or formulations may range from 300 to 10,000 and is preferably between 1,000 and 5,000. Blends of polyglycols of different average molecular weights may also be employed effectively in the foaming reactant compositions. Polyethyleneglycols and polypropyleneglycols are commercially available in selected average molecular weights but containing factors or portions varying in molecular composition and it will usually be preferred to employ such commercial products although, of course, polyglycols each having a single molecular weight or a single range of molecular weights in their composition may be used individually or in blends as desired. Accordingly, where the expression "average molecular weight" is employed in the above examples, it is intended to mean the average molecular weight of the polyethylene glycols or polypropylene glycols as commercially available and containing factors or portions varying in molecular composition although, as just noted, polyglycols each having a single molecular weight or a single range of molecular weights may, if desired, be employed in the preparation of the resins of the invention.

The following is a reaction chart for preparing a typical "A" resin such as above described. The synthesizing of the resin should be carried out in a glass-lined reactor, a stainless steel reactor, or the like, and the temperatures, as well as the reaction times should be controlled. The time sequences will, of course, vary with the size of the batch or run and the tailoring of the final resin to the desired or specified amine equivalent. The following chart covers the preparation of a pilot run in which approximately 1 gallon of the resin is produced, it being understood that the components referred to in the chart are merely illustrative of this type of resin.

PHASE I

| Total Elapsed Time | Temperature, °F. | Amine Equiv. | Order of Component Addition to Reactor |
|---|---|---|---|
| 0 | 70 | | Isocyanate added. |
| 0 | 70 | | Diol added. |
| 20 | 150 | | Diol addition complete. |
| 40 | 150 | | polyurethane reaction complete. |

PHASE II

| | | | |
|---|---|---|---|
| 40 | 150 | | Difunctional acid added. |
| 90 | 150 | | water added. |
| 100 | 150 | | reaction finished. |

PHASE III

| | | | |
|---|---|---|---|
| 100 | 150 | | reticulating agent added. |
| 105 | 150 | | reticulating agent addition complete. |
| 135 | 150 | | |
| 145 | 250 | | |
| 165 | 250 | | reaction finished. |
| 200 | 70 | 550 | (cooling period.) |

The following chart or schedule illustrates the preferred sequence of adding or incorporating typical components in preparing a type B resin relative to the temperatures, timing, etc. The above comments concerning the preparation of the A resins are applicable to the synthesizing of the B resins.

PHASE I

| Time | Temperature, °F. | Component Added |
|---|---|---|
| 0 | 70 | meta toluene diisocyanate. |
| 0 | 70 | polypropylene glycol water mixture. |
| 20 | 200 | polypropylene glycol addition finished. |
| 50 | 200 | reaction time. |

PHASE II

| | | |
|---|---|---|
| 90 | 200 | a Class "C" Type I-a polyester resin added. |

PHASE III

| | | |
|---|---|---|
| 100 | 200 | 1,2,6 hexane triol added. |
| 110 | 260 | 1,2,6 hexane triol all in final reaction. |
| 125 | 260 | amine equivalent 308. |

The above described Resins A and B are useful in preparing cellular plastics or foamed plastic materials that are flexible and resilient and that are adapted to be formed, applied, or use by the foamed-in-place technique, that is by merely pouring or otherwise introducing the liquid reactant mixture into a mold, other cavity surface, etc. to react and foam up at atmospheric pressure and at room temperatures. The reactant foaming compositions for preparing the flexible resilient cellular plastic materials include, generally, a resin, A or B, or a resin blend (A and B), a catalyst, a foaming agent or gassing agent and, if desired, one or more modifiers. The versatility of the physical characteristics of the foamed plastics of the invention is materially enlarged by the employment of preferred catalysts described below. Furthermore, it will be apparent that the physical properties and characteristics of the resultant cellular plastics may be varied appreciably by controlling or altering the relative proportions of the constituent ingredients, the specific ingredients employed and by the use of wetting agents, free isocyanates, pigments, etc.

The Resin A or B, or the blend of such resins, as employed in the reactant mixtures or compositions for preparing the cellular plastics is preferably employed in the proportion of from 82 to 99% by weight of the total with an optimum of approximately 94% by weight of the total. The catalyst, or the blend of catalysts, employed in the reactant foaming mixture is preferably used in the proportion of from 0.4–15% by weight of the total with an optimum of approximately 3% by weight of the total. The preferred proportion range of the gassing agent or foaming agent is from 0.4–15% by weight of the total with an optimum of approximately 3% by weight of the total. The Resins A and Resins B have been described above and are represented by Resins 1 to 31 inclusive. Blends of the A and B type resins and a labile hydrogen reactive resin or resins such as the polyesters, the polyamides, the silicone base polyesters and the alkyl polysulfide resins, above described, may be employed as the resin component of the reactant foaming mixture. These labile hydrogen reactive resins are used preferably in a proportion range not to exceed 30% by weight of the selected Resin A, selected Resin B, or selected blend of Resins A and B.

The catalyst or catalysts blends incorporated in the reactant foaming mixtures for preparing the cellular plastic products are employed to set or cure the foam at controlled rates. The catalysts also assist in determining and controlling the resiliency and other physical properties of the final cellular products. It is a feature of the invention that catalysts of various kinds and types may be used successfully in preparing the reactant foaming compositions of the invention. However, we have found that the following classes of catalysts are preferred in preparing the reactant or foaming mixtures:

Catalyst W—aliphatic alkali metal ester soap solutions
Catalyst X—polycarboxylic aliphatic or aromatic acids (aliphatic or aromatic)
Catalyst Y—heterocyclic nitrogen base compositions
Catalyst Z—permutations and combinations of these catalysts.

Catalysts of the W class are represented by the following general formulae, where $n$ may vary from 7 to 21 and M is an alkali metal.

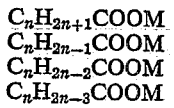

The following are typical preferred catalysts of this group or class, each identified by a numeral:

(1) Potassium ricinoleate
(2) Potassium oleate
(3) Sodium tetra decanoate
(4) Lithium stearate
(5) Cesium laurate
(6) Potassium laurate
(7) Sodium linoleate
(8) Lithium caprylate The typical preferred aliphatic polycarboxylic acids of Class X catalyst, above mentioned are:

(9) Tartaric
(10) Butanetetracarboxylic

The typical preferred catalysts of the above mentioned Class Y, that is the heterocyclic nitrogen base compositions include:

(11) Quinoline
(12) Melamine
(13) Morpholine
(14) Methylmorpholine
(15) Thialdine
(16) N-hydroxy ethyl morpholine
(17) N-hydroxy butyl morpholine Mixtures, blends and combinations of these catalysts 11 to 17 inclusive, are useful in obtaining an effective catalyst component for the foaming or reacting resinous mixtures.

The following are typical preferred examples of catalysts of the Z class, each catalyst being designated by number. In the following Class Z catalysts the glycerol monoricinoleate constituent contains from 5 to 15% by weight of potassium soap.

Catalyst 18:
Glycerol monoricinoleate
N-hydroxyethyl morpholine 1% by weight of the total or if desired from 1 to 5% by weight of the total Catalyst 19:
Glycerol monoricinoleate
Melamine, 1% by weight of the total or from 1 to 5% by weight of the total Catalyst 20: glycerol monoricinoleate Catalyst 21:
Glycerol monoricinoleate, 50% by weight
Butane tetracarboxylic acid, 50% by weight
In Catalyst 21 the butane tetracarboxylic acid may be used in the proportion of from 0.1 to 70% by weight, the balance being the glycerol monoricinoleate-potassium soap mixture.

Catalyst 22:
Glycerol monoricinoleate, 90% by weight
Tetraethanol ammonium hydroxide, 10% by weight
In Catalyst 22 the tetraethanol ammonium hydroxide may be used in the proportion of from 1 to 20% by weight with the balance being the glycerol monoricinoleate.

Catalyst 23:
Triethanolamine, 50% by weight
Hydrazine, 50% by weight
In Catalyst 23 the hydrazine may be employed in the proportion of from 1 to 60% by weight, the balance being the triethanolamine.

Catalyst 24:
Sodium polypropylene glycolate, 50% by weight
Average molecular weight 3000 (range 20–10,000)
N-methylmorpholine, 50% by weight
In Catalyst 24, the N-methylmorpholine may be used in the proportion of from 1 to 60% by weight, the balance being the sodium polypropylene glycolate.

Catalyst 25:
Mixture of N-hydroxyethylmorpholine, 10% triethanolamine, 90%
In Catalyst 25 the triethanolamine may be used in the proportion of from 1 to 15% by weight with the balance being the N-hydroxyethylmorpholine.

The following are other catalysts that have been found to be practical and effective in the reactant foaming mixtures of the invention, each catalyst being identified by a reference numeral; 26—alkalimetal phenylate, 27—alkalimetal salt of resorcinol (Catalysts 26 and 27 being representative of alkali metal, mono unsubstituted salts of monohydric and polyhydric phenols). 28—an alkali metal hydroxide in a wetting agent solution, namely from 6 to 30 mols ethylene oxide per mol of oleyl alcohol, 29—an alkali metal hydroxide in a wetting agent solution, namely from 6 to 20 mols ethyleneoxide per mol of B-naphthol, 30—triethanol amine, 31—tetraethanolammonium hydroxide (catalysts such as 30 and 31 include alkylamines, alcoholamines and amidines), 32—monosodium ethylate ethanolamine, and 33—salts of alkyl or alkylpolycarboxylic acids and alcoholamines. Further, if desired, amine soaps of alkyl or alcohol aryl monobasic or polybasic acids or hydroxy monobasic acids may be used as catalysts. Representative of this class of catalyst is Catalyst 34 which is prepared from ricinoleic acid (1–5% by wt.) triethanolamine (1–5% by wt.) and the remainder of butane tetra carboxylic acid.

The gassing agent is incorporated in the foaming reacting resinous mixtures to generate gas and thus produce cell formation and consequent expansion and density control of the resultant resinous masses. Gas is generated in a resinous reactant mixture of the invention by the reaction of an isocyanate contained therein with water or organic acids. Water may be supplied to the reactant mixture by direct addition in the amount of from 0.05% to 8% by weight of the resin component. If desired, water may be incorporated in or supplied to the reactant mixture by the incorporation therein of water carriers such as agar, gelatin, gum tragacanth, cellulose, carboxymethyl cellulose, etc. containing a suitable quantity or proportion of water or by including in the resinous reactant mixture a suitable salt hydrate.

Pigments or fillers such as titanium dioxide, lithopone, metal powders, silica powder, mica dust powder, litharge and ochre may be included in the reactant resinous mixtures in proportions not to exceed 100% by weight of the resin component. Dyes may be incorporated in the reactant resinous compositions including malachite green, Sudan red, Congo red, etc. in amounts not to exceed 5% by weight of the resin component. If desired or necessary for particular products or applications, fibrous fillers such as asbestos, rayon flock, glass fiber, etc. may be added in amounts not to exceed 100% by weight of the resinous component of the mixture.

Other modifiers that may be incorporated in the foaming resinous mixtures include plasticizers, wetting agents, isocyanates and isothiocyanates. The plasticizers useful as modifiers include dioctylphthalate, di-2 ethylhexyladipate, methylabitate, cyclohexyl levulinate, and trioctyl phosphate in the proportion of from 0.1 up to 50% by weight of the resinous component. Other plasticizers that are suitable for the purpose include polyesteramide, polyoxymethylene and polyamide types. The wetting agents that may, if desired, be included in the reactant foaming resinous mixtures in proportions not to exceed 3.0% by weight of the resinous component include a polyoxyethylene ether of an alkyl phenol, a sodium alkyl phosphate of the general formula $R_5$—$(P_3O_5)_2$ $Na_5$— where R is either 2-ethylhexyl or octyl-2, bis(2-ethylhexyl) sodium sulfosuccinate, a propylated napthalene sulfonate, a fatty acid ester of an anhydrosorbitol solubilized with ethylene oxide and an anhydrosorbitol ester not etherified, and long chain alkyl ammonium soaps such as dicocodimethylammonium chloride of Armour, etc. The free isocyanates that may be employed as modifiers for the foaming reactant resinous mixtures include isothiocyanates, isocyanates and single molecules containing both radicals as 2-4 toluene isocyanate-isothiocyanate. Such free isocyanates may be incorporated in the mixtures in proportions not to exceed 25% by weight of the total resinous component.

In order to produce foamed or cellular plastic products having certain physical properties or attributes it may be found desirable to incorporate in the resinous foaming reactant mixtures polyester, polyamide, silicol polyester, polyesteramide, or polysulfide resins. Such modifying resins may be employed in the proportion not to exceed 50% by weight of the primary resinous component of the mixture. Solvents such as methylethyl ketone, ether and acetone may be added to or incorporated in the foaming reactant mixtures in proportions not to exceed 70% by weight of the resinous component.

The following are typical preferred examples of the formulations for the reactant foaming resinous compositions of the invention for producing flexible, resilient cellular plastic products.

The following are typical formulae for preparing the reactant foaming resinous compositions of the invention for producing the flexible, resilient cellular plastic products. In these examples the proportions or values are in parts by weight. The abbreviation Opt. designates the preferred or optimum proportions and the designations Min. and Max. respectively designate the minimum and maximum proportions respectively of the ingredients. The abbreviations AE means amine equivalent.

EXAMPLE 1

|  | Min. | Max. | Opt. |
|---|---|---|---|
| Resin 1, AE 500-600 | 20 | 40 | 30 |
| potassium ricinoleate | 1 | 1 | 1 |
| water | 1 | 1 | 1 |

In Example 1, Catalyst 1, that is the potassium ricinoleate, may be replaced in whole or in part by any of the other catalysts of the Class W catalyst, that is by potassium oleate, sodium tetra decanoate, etc.

EXAMPLE 2

|  | Min. | Max. | Opt. |
|---|---|---|---|
| Resin 2, AE 400-500 | 30 | 30 | 30 |
| potassium oleate | ⅛ | ¼ | ½ |
| water | 1 | 1 | 1 |

In Example 2 the potassium oleate may, if desired, be replaced in whole or in part by sodium tetra decanoate, lithium stearate, or cesium laurate.

EXAMPLE 3

|  | Min. | Max. | Opt. |
|---|---|---|---|
| Resin 3, AE 500-600 | 30 | 30 | 30 |
| sodium tetra decanoate | 1 | 1 | 1 |
| water | ⅛ | ¼ | ½ |

In Example 3 the sodium tetra decanoate may be replaced, if desired, in whole or in part by potassium laurate, sodium linoleate, lithium caprylate, tartaric acid or butane tetra carboxylic acid.

EXAMPLE 4

|  | Min. | Max. | Opt. |
|---|---|---|---|
| Resin 3, AE 500-700 | 20 | 30 | 35 |
| lithium stearate | 1 | 1 | 1 |
| water | 1 | 1 | 1 |

In Example 4 the Resin 3 may, if desired, be replaced by Resins 11 through 15 inclusive, or by blends of such resins.

EXAMPLE 5

|  | Min. | Max. | Opt. |
|---|---|---|---|
| Resin 4, AE 500-700 | 15 | 35 | 40 |
| cesium laurate | 1 | ½ | 1 |
| water | ⅛ | ¼ | 1 |

In preparing the reactant mixture of Example 5, the Resin 4 may be replaced in whole or in part by any of Resins 15 to 20 inclusive.

EXAMPLE 6

|  | Min. | Max. | Opt. |
|---|---|---|---|
| Resin 5, AE 500-700 | 18 | 30 | 35 |
| potassium laurate | 1 | 3 | 2 |
| water | 1 | 1 | 2 |

In Example 6 the Resin 5 may be replaced in whole or in part by any of Resins 21 to 25 inclusive, or by blends thereof.

EXAMPLE 7

|  | Min. | Max. | Opt. |
|---|---|---|---|
| Resin 6, AE 500-700 | 15 | 30 | 35 |
| sodium linoleate | ⅛ | 2 | 1 |
| water | ¼ | 1 | 1 |

If desired, the Resin 6, in Example 7, may be replaced in whole or in part by Resins 26 to 31 inclusive.

EXAMPLE 8

|  | Min. | Max. | Opt. |
|---|---|---|---|
| Resin 7, AE 500-700 | 15 | 30 | 40 |
| lithium caprylate | 1 | 1 | 1 |
| water | 1 | 1 | 1 |

In preparing the resinous mixture of Example 8, tartaric acid or butane tetra carboxylic acid may be employed instead of the lithium caprylate.

EXAMPLE 9

|  | Min. | Max. | Opt. |
|---|---|---|---|
| Resin 8, AE 500-700 | 20 | 30 | 35 |
| tartaric acid | 2 | 3 | 5 |
| water | 1/8 | 1/8 | 1/4 |

In Example 9, butane tetra carboxylic acid may be employed instead of the tartaric acid as the catalyst component.

EXAMPLE 10

|  | Min. | Max. | Opt. |
|---|---|---|---|
| Resin 9, AE 500-700 | 25 | 30 | 35 |
| butane tetracarboxylic acid | 1 | 2 | 3 |
| water | 1 | 1/2 | 1/4 |

In Example 10 tartaric acid may be employed instead of the butane tetracarboxylic acid.

EXAMPLE 11

|  | Min. | Max. | Opt. |
|---|---|---|---|
| Resin 10, AE 500-700 | 15 | 30 | 35 |
| quinoline | 1 | 2 | 2 |
| water | 1 | 1/2 | 1/8 |

In Example 11 melamine morpholine, methyl morpholine, thialdine, or hydroxy butyl morpholine may be employed instead of the quinoline.

EXAMPLE 12

|  | Min. | Max. | Opt. |
|---|---|---|---|
| Resin 11, AE 500-700 | 20 | 25 | 40 |
| melamine | 5 | 2 | 2 |
| water | 1 | 1/2 | 1/4 |

EXAMPLE 13

|  | Min. | Max. | Opt. |
|---|---|---|---|
| Resin 12, AE 500-700 | 20 | 25 | 30 |
| morpholine | 1/2 | 2 | 3 |
| water | 1/8 | 1/4 | 1/8 |

In Example 13 the morpholine may be replaced, if desired, by the mixture of N-hydroxyethylmorpholine-tripotassium salt of triethanolamine.

EXAMPLE 14

|  | Min. | Max. | Opt. |
|---|---|---|---|
| Resin 13, AE 500-700 | 20 | 30 | 40 |
| methylmorpholine | 1 | 1 | 2 |
| water | 1/4 | 1 | 1 |

In Example 14 the methylmorpholine may, if desired, be replaced by the above described Catalyst 25, namely the mixture of N-hydroxyethylmorpholine-triethanolamine.

EXAMPLE 15

|  | Min. | Max. | Opt. |
|---|---|---|---|
| Resin 14, AE 500-700 | 20 | 30 | 35 |
| thialdine | 2 | 4 | 6 |
| water | 1 | 2 | 3 |
| malachite green | 1/16 | 1/16 | 1/8 |

In Example 15 the thialdine may be replaced by any one of the type Z catalysts above described; that is by any of Catalysts 18 to 25 inclusive.

EXAMPLE 16

|  | Min. | Max. | Opt. |
|---|---|---|---|
| Resin 15, AE 500-700 | 18 | 25 | 30 |
| N-hydroxyethylmorpholine | 2 | 1 | 2 |
| water | 1 | 1 | 1 |
| glass fiber | 1/2 | 1/4 | 2 |

In Example 16 any one of the Z type catalysts, that is any one of Catalysts 18 to 25 inclusive, may replace the N-hydroxyethylmorpholine.

EXAMPLE 17

|  | Min. | Max. | Opt. |
|---|---|---|---|
| Resin 15, AE 500-700 | 16 | 27 | 38 |
| hydroxybutylmorpholine | 4 | 3 | 2 |
| water | 1 | 1/2 | 1 |
| methyl abietate | 2 | 3 | 4 |

If desired, in preparing the resinous foaming mixture of Example 17 the hydroxybutylmorpholine may be replaced by an aliphatic polycarboxylic acid such as tartaric or butane tetracarboxylic acid.

EXAMPLE 18

|  | Min. | Max. | Opt. |
|---|---|---|---|
| Resin 15, AE 500-700 | 20 | 30 | 40 |
| potassium ricinoleate | 1 | 2 | 2 |
| water | 1 | 1 | 2 |
| a propylated naphthalene sulfonate | 1/8 | 1/16 | 1/2 |

In this Example 18, the potassium ricinoleate may, if desired, be replaced by any of the above described alkali metal salts of fatty acids designated Catalysts 2 through 8.

EXAMPLE 19

|  | Min. | Max. | Opt. |
|---|---|---|---|
| Resin 16, AE 200-400 | 20 | 40 | 30 |
| potassium ricinoleate | 1 | 1 | 1 |
| water | 1 | 1 | 1 |

EXAMPLE 20

|  | Min. | Max. | Opt. |
|---|---|---|---|
| Resin 17, AE 200-300 | 20 | 30 | 30 |
| potassium oleate | 1/8 | 1/4 | 1/2 |
| water | 1 | 1 | 1 |

EXAMPLE 21

|  | Min. | Max. | Opt. |
|---|---|---|---|
| Resin 18, AE 300-400 | 30 | 30 | 30 |
| sodium tetra decanoate | 1 | 1 | 1 |
| water | 1/8 | 1/4 | 1/2 |

EXAMPLE 22

|  | Min. | Max. | Opt. |
|---|---|---|---|
| Resin 19, AE 300-400 | 20 | 40 | 30 |
| potassium ricinoleate | 1 | 1 | 1 |
| water | 1 | 1 | 1 |

EXAMPLE 23

|  | Min. | Max. | Opt. |
|---|---|---|---|
| Resin 20, AE 200-400 | 20 | 40 | 30 |
| potassium ricinoleate | 1 | 1 | 1 |
| water | 1 | 1 | 1 |

In Example 23 the potassium ricinoleate may be replaced by any of the above identified Catalysts 11 to 17 inclusive.

EXAMPLE 24

|  | Min. | Max. | Opt. |
|---|---|---|---|
| Resin 21, AE 300–400 | 20 | 40 | 30 |
| potassium ricinoleate | 1 | 1 | 1 |
| water | 1 | 1 | 1 |

In Example 24 the potassium ricinoleate may, if desired, be replaced by triethanolamine or tetraethanol ammonium hydroxide.

EXAMPLE 25

|  | Min. | Max. | Opt. |
|---|---|---|---|
| Resin 22, AE 300–400 | 20 | 40 | 30 |
| potassium ricinoleate | 1 | 1 | 1 |
| water | 1 | 1 | 1 |

EXAMPLE 26

|  | Min. | Max. | Opt. |
|---|---|---|---|
| Resin 23, AE 200–300 | 20 | 40 | 30 |
| potassium oleate | 1 | 1 | 1 |
| water | 1 | 1 | 1 |

EXAMPLE 27

|  | Min. | Max. | Opt. |
|---|---|---|---|
| Resin 24, AE 250–350 | 20 | 40 | 30 |
| thialdene | 1 | 1 | 1 |
| water | ¼ | 1 | 1 |
| lithopone | ½ | ⅛ | 1 |

In Example 27 the lithopone may, if desired, be replaced by either a suitable metal powder or silica.

EXAMPLE 28

|  | Min. | Max. | Opt. |
|---|---|---|---|
| Resin 25, AE 300–500 | 20 | 40 | 30 |
| Catalyst 18 | 1 | 1 | 2 |
| water | ¼ | 1 | 1 |
| asbestos | ½ | ⅛ | 1 |

The Catalyst 18 of Example 28 is the glycerol monoricinoleate-potassium soap - N - hydroxyethylmorpholine blend above described. In this Example 28, the asbestos may be replaced by mica dust, rayon flock, or glass fiber.

EXAMPLE 29

|  | Min. | Max. | Opt. |
|---|---|---|---|
| Resin 26, AE 300–450 | 20 | 30 | 35 |
| sodium phenylate | 2 | 4 | 6 |
| water | 1 | 2 | 3 |
| bis(2-ethylhexyl) sodium sulfosuccinate | 1/16 | 1/16 | ⅛ |

In Example 29 the Victawet may, if desired, be replaced by the previously described aerosols, Tween, Span, or a long chain alkyl ammonium soap such as dicocoadimethylammoniumchloride.

EXAMPLE 30

|  | Min. | Max. | Opt. |
|---|---|---|---|
| Resin 27, AE 250–350 | 20 | 30 | 35 |
| triethanol amine | 2 | 4 | 6 |
| water | 1 | 2 | 3 |
| dioctylphthalate | 1/16 | 1/16 | ⅛ |

In Example 30 the dioctylphthalate may be replaced in whole or in part by methylabietate, cyclohexylevulinate or trioctylphosphate.

EXAMPLE 31

|  | Min. | Max. | Opt. |
|---|---|---|---|
| Resin 28, AE 300–400 | 20 | 40 | 30 |
| lithium stearate | 1 | 1 | 1 |
| water | 1 | 1 | 1 |

EXAMPLE 32

|  | Min. | Max. | Opt. |
|---|---|---|---|
| Resin 29, AE 200–400 | 20 | 40 | 30 |
| sodium linoleate | 1 | 1 | 1 |
| water | 1 | 1 | 1 |

EXAMPLE 33

|  | Min. | Max. | Opt. |
|---|---|---|---|
| Resin 30, AE 300–400 | 20 | 40 | 30 |
| lithium caprylate | 1 | 1 | 1 |
| water | 1 | 1 | 1 |

EXAMPLE 34

|  | Min. | Max. | Opt. |
|---|---|---|---|
| Resin 31, AE 300–400 | 20 | 40 | 30 |
| N-hydroxy butyl morpholine | 1 | 1 | 1 |
| water | 1 | 1 | 1 |

In preparing the reactant or foaming resinous mixture the respective ingredients are thoroughly mixed together and the resultant mixture is poured in place, applied by spatula, brushing, spreading, dipping, or the like, and allowed to react at room temperature and atmospheric pressure. The poured or applied mixture reacts and foams up to a substantially uniform cellular or foamaceous mass characterized by a multitude of communicating cells. After setting, the product may be post-cured at a moderate temperature of from 125 to 250° F. The resultant products are flexible and resilient, are abrasion resistant and tough, being resistant to tearing. The spring-back or resiliency of the product can be controlled by selection of constituent ingredients to either have a relatively rapid rate of return or a slow return rate.

The resins herein described form the subject matter of our copending application for patent, Serial Number 455,766, filed September 13, 1954.

It should be understood that the invention is not to be considered as based upon or dependent upon any theories which we have expressed. Nor is the invention to be regarded as limited to the express procedure or material set forth.

We claim:

1. The flexible resilient elastomeric cellular material which is the product of reaction of a composition comprising on an approximate percentage by weight basis from 0.4 to 15% of an alkaline catalyst selected from the group consisting of potassium ricinoleate, potassium oleate, sodium tetradecanoate, lithium stearate, cesium laurate, potassium laurate, sodium linoleate, lithium caprylate, quinoline, melamine, morpholine, methylmorpholine, thialdine, N-hydroxy ethyl morpholine, N-hydroxy butyl morpholine, tetraethanol ammonium hydroxide, triethanolamine, and hydrazine, from 0.4 to 15% of water as a gassing agent component, and from 82 to 99% of a prepolymer resin having an amine equivalent from 150 to 1000 prepared from, on a mol percent basis, a polyurethane intermediate prepared by reacting a polyisocyanate and, on a mol percent basis, from 2.5 to 23.5% of a diol alcohol selected from the group consisting of 1,4 butanediol, 2 methylbutanediol, 1,4 hexanediol, 1,3 propylene glycol, butynediol and polypropylene glycol having a molecular weight range of 400 to 10,000, the polyisocyanate being in the proportion of from 64 to 84% of the total resin and being selected from the group consisting of 2,4 toluene diisocyanate, 2,6 toluene diisocyanate, dianisidene diisocyanate, p-p' diisocyanato diphenyl methane and 2,5 naphthalene diisocyanate, from 2.5 to 23.5% of a bifunctional acid selected from the group consisting of malonic acid, succinic acid, sebacic acid, adipic acid, pimelic acid, azelaic acid, ricinoleic, glycolic, hydroxy propionic and 1-hydroxy-decanoic reacted with said intermediate, and from 1 to 16% of a polyhydric alcohol having more than two OH groups reacted with the resultant intermediate selected from the group consisting of glycerol, polyglycerol, mannitol, sorbitol, pantaerythritol, dipentaerythritol, 1,2,6 hexanetriol, and 1,2,4 butanetriol, trimethylpropane and from 0.5 to 8.5% water added subsequent to the addition of the bifunctional acid component.

2. The flexible resilient elastomeric cellular material which is the product of reaction of a composition comprising, on an approximate percentage by weight basis, from 0.4 to 15% of potassium ricinoleate, from 0.4 to 15% water as a gassing agent component, and from 82 to 99% of a prepolymer resin having an amine equivalent of from 150 to 1000 prepared, on a mol percent basis, from a polyurethane intermediate prepared by reacting from 64 to 84% of a polyisocyanate from the group consisting of 2,4 toluene diisocyanate, 2,6 toluene diisocyanate, dianisidene diisocyanate p-p' diisocyanato, diphenyl methane, and 2,5 naphthalene diisocyanate, with from 2.5 to 23.5% of a diol alcohol selected from the group consisting of polypropylene glycol having a molecular weight range of 400 to 10,000, 1,3 propylene glycol, butynediol, 1,4 hexanediol, 2 methylbutane diol, and 1,4 butanediol; from 2.5 to 23.5% of a bifunctional acid selected from the group consisting of malonic, succinic, sebacic, adipic, pimelic, azelaic, ricinoleic, glycolic, hydroxy propionic and 1-hydroxy decanoic; from 1 to 16% of a polyhydric alcohol having more than two OH groups serving as a reticulating agent; selected from the group consisting of glycerol, polyglycerol, mannitol, sorbitol, pentaerythritol, 1, 2, 6 hexanetriol, 1, 2, 4 butanetriol, and trimethylolpropane and from 0.5 to 8.5% water being added subsequent to the addition of said bifunctional acid component, said bifunctional acid component being reacted with said intermediate and the reticulating agent being reacted with the resultant resin.

3. The resilient elastomeric cellular reaction product of the composition comprising, on the basis of approximate parts by weight, 1 part water, 1 part potassium ricinoleate, and from 20 to 40 parts of a resin having an amine equivalent of from 150 to 1000 prepared from, on the basis of mol percentages, 74% 2,4 toluene diisocyanate, 9% polypropylene glycol having a molecular weight range of 400 to 10,000, 9% ricinoleic acid, 2% water being added subsequent to the addition of said ricinoleic acid and from 2 to 8% 1,2,6 hexanetriol, the diisocyanate and glycol being pre-reacted to form an intermediate, and the acid and 1,2,6 hexanetriol being successively reacted with the intermediate.

4. The resilient elastomeric cellular reaction product of the composition comprising on an approximate parts by weight basis from 1 to 3 parts water, from 2 to 6 parts thialdine, and from 20 to 35 parts of a resin prepared on an approximate mole percentage basis from 2 to 15% polypropylene glycol having an average molecular weight of 4000, 74.4% meta toluene diisocyanate, 2.3% water, 4.6% 1,2,6 hexanetriol, and 9.3% hydroxy propionic acid, said resin having an amine equivalent of from 400 to 700, the diisocyanate and glycol being pre-reacted to form an intermediate and the acid and 1,2,6 hexanetriol being successively reacted with the intermediate and said 2.3% water being added subsequent to the addition of said hydroxy propionic acid.

5. The resilient elastomeric cellular reaction product of the composition comprising, on an approximate parts by weight basis, from 0.4 to 15 parts water, from 0.4 to 15 parts of an alkaline catalyst selected from the group consisting of potassium ricinoleate, potassium oleate, sodium tetradecanoate, lithium stearate, cesium laurate, potassium laurate, sodium linoleate, lithium caprylate, quinoline, melamine, morpholine, methylmorpholine, thialdine, N-hydroxy ethyl morpholine, N-hydroxy butyl morpholine, tetraethanol ammonium hydroxide, triethanolamine and hydrazine, and from 20 to 40 parts of a prepolymer resin having an amine equivalent of from 150 to 1000 prepared on a mol percentage basis from 64 to 84% of a polyisocyanate selected from the group consisting of 2,4 toluene diisocyanate, 2,8 toluene diisocyanate, dianisidene diisocyanate, p-p' diisocyanato diphenyl methane and 2,5 naphthalene diisocyanate, from 2.5 to 23.5% of a diol alcohol selected from the group consisting of 1,4 butane diol, 2 methylbutane diol, 1,4 hexanediol, butynediol, 1,3 propylene glycol and polypropylene gycol having a molecular weight range of 400 to 10,000, from 2.5 to 23.5% of a hydroxy carboxylic acid having a molecular weight of from 75 to 800, from 1 to 16% of a polyhydric alcohol having more than 2 OH groups selected from the group consisting of glycerol, polyglycerol, mannitol, sorbitol, pentaerythritol, dipentaerythritol, 1,2,6 hexanetriol, and 1,2,4 butanetriol as a reticulating agent, and from 0.6 to 8.7% water being added subsequent to the addition of said hydroxy carboxylic acid, the polyisocyanate and diol alcohol being reacted to form an intermediate and the acid and polyhydric alcohol being successively reacted with the intermediate.

6. The flexible elastomeric cellular material which is the reaction product of the composition comprising on an approximate percentage by weight basis from 0.4 to 15% of an alkaline catalyst selected from the group consisting of potassium ricinoleate, potassium oleate, sodium tetradecanoate, lithium stearate, cesium laurate, potassium laurate, sodium linoleate, lithium caprylate, quinoline, melamine, morpholine, methylmorpholine, thialdine, N-hydroxy ethyl morpholine, N-hydroxy butyl morpholine, tetraethanol ammonium hydroxide, triethanolamine and hydrazine, from 0.4 to 15% water as a gassing agent, from 82 to 99% of a prepolymer resin having an amine equivalent of from 150 to 1000 and prepared on a mol percent basis from 2.5 to 23.5% of a diol alcohol selected from the group consisting of 1,4 butanediol, 2 methylbutane diol, 1,4 hexanediol, butynediol, 1,3 propylene glycol and polypropylene glycol having a molecular weight range of 400 to 10,000, from 2.5 to 23.5% of a hydroxy carboxylic acid having a molecular weight of from 75 to 800, from 1 to 16% of a polyhydric alcohol having more than 2 OH groups selected from the group consisting of glycerol, polyglycerol, mannitol, sorbitol, pentaerythritol, dipentaerythritol, 1,2,6 hexanetriol and 1,2,4 butanetriol, from 64 to 84% polyisocyanate selected from the group consisting of 2,4 toluene diisocyanate, 2,6 toluene diisocyanate, dianisidene diisocyanate, p-p' diisocyanato diphenyl methane and 2,5 naphthalene diisocyanate and from 0.6 to 8.7% water being added subsequent to the addition of said hydroxy carboxylic acid, the polyisocyanate and the diol alcohol being reacted to form an intermediate and the acid and reticulating agent being successively reacted with the intermediate.

7. The flexible elastomeric resilient cellular material which is the product of reaction of a foaming composition comprising on an approximate percentage by weight basis from 0.4 to 15% of an alkaline catalyst selected from the group consisting of potassium ricinoleate, potassium oleate, sodium tetradecanoate, lithium stearate, cesium laurate, potassium laurate, sodium linoleate, lithium caprylate, quinoline, melamine, morpholine, methylmorpholine, thialdine, N-hydroxy ethyl morpholine, N-hydroxy butyl morpholine, tetraethanol ammonium hydroxide, triethanolamine, and hydrazine, from 0.4 to 15% of water as a gassing agent component, and from 82 to 99% of a prepolymer resin having an amine equivalent of from 150 to 1000 prepared on a mol percent basis from 2.5 to 23.5% of a diol alcohol selected from the group consisting of 1,4 butanediol, 2 methyl butane diol, 1,4 hexanediol, polypropylene glycol having a molecular weight range of 400 to 10,000, butynediol and 1,3 propylene glycol, from 2.5 to 23.5% of a bifunctional acid selected from the group consisting of malonic acid, succinic acid, sebacic, adipic, pimelic, azelaic, hydroxy propionic, 1-hydroxy decanoic acid, ricinoleic acid and glycolic acid, from 1 to 16% of polyhydric alcohol having more than 2 OH groups selected from the group consisting of glycerol, polyglycerol, mannitol, sorbitol, pentaerythritol, dipentaerythritol, 1,2,6 hexanetriol and 1,2,4 butanetriol, from 64 to 84% of a polyisocyanate selected from the group consisting of 2,4 toluene diisocyanate, 2,6 toluene diisocyanate, dianisidene diisocyanate, p-p' diisocyanato diphenyl methane and 2,5 naphthalene diisocyanate, and from 0.6 to 8.7% water being added subsequent to the addition of said bifunctional acid component, the polyisocyanate and diol being pre-reacted to form an intermediate and the acid component and reticulating agent being successively reacted with the intermediate.

8. The flexible elastomeric resilient cellular material which is the product of reaction of a foaming composition comprising on an approximate percentage by weight basis from 0.4 to 15% of an alkaline catalyst selected from the group consisting of potassium ricinoleate, potassium oleate, sodium tetradecanoate, lithium stearate, cesium laurate, potassium laurate, sodium linoleate, lithium caprylate, quinoline, melamine, morpholine, methylmorpholine, thialdine, N-hydroxy ethyl morpholine, N-hydroxy butyl morpholine, tetraethanol ammonium hydroxide, triethanolamine and hydrazine, from 0.4 to 15% of water as a gassing agent component, and from 82 to 99% of a prepolymer resin having an amine equivalent of from 150 to 1000 prepared from, on the basis of mol percentages, 74% 2,4 toluene diisocyanate, 9% polypropylene glycol having a molecular weight range of 400 to 10,000, 9% rincinoleic acid, 2% water being added subsequent to the addition of said ricinoleic acid, and from 2 to 8% 1,2,6 hexanetriol, the diisocyanate and glycol being pre-reacted to form an intermediate, and the acid and 1,2,6 hexanetriol being successively reacted with the intermediate.

References Cited in the file of this patent

UNITED STATES PATENTS

| | | |
|---|---|---|
| 2,602,783 | Simon et al. | July 8, 1952 |
| 2,650,212 | Windemuth | Aug. 25, 1953 |
| 2,729,618 | Muller et al. | Jan. 3, 1956 |